United States Patent
Landick

(10) Patent No.: US 10,216,231 B1
(45) Date of Patent: Feb. 26, 2019

(54) MOVING MAGNET ACTUATOR FOR HAPTIC ALERTS

(71) Applicant: NVF Tech Ltd., St. Neots, Cambridgeshire (GB)

(72) Inventor: Graham Robert Landick, Coveney (GB)

(73) Assignee: NVF Tech Ltd, Cambridgeshire (GB)

(*) Notice: Subject to any disclaimer, the term of this patent is extended or adjusted under 35 U.S.C. 154(b) by 0 days.

(21) Appl. No.: 15/972,055

(22) Filed: May 4, 2018

Related U.S. Application Data

(60) Provisional application No. 62/633,027, filed on Feb. 20, 2018.

(51) Int. Cl.
- *G06F 1/18* (2006.01)
- *G06F 1/16* (2006.01)
- *G08B 6/00* (2006.01)

(52) U.S. Cl.
CPC ............ *G06F 1/1656* (2013.01); *G06F 1/163* (2013.01); *G06F 1/181* (2013.01); *G08B 6/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,704,001 B1* | 3/2004 | Schena | ................. | G05G 9/047 310/12.04 |
| 6,982,696 B1* | 1/2006 | Shahoian | ................. | G06F 3/016 345/156 |
| 7,319,374 B2* | 1/2008 | Shahoian | ................. | H01F 7/16 310/12.24 |
| 8,059,104 B2* | 11/2011 | Shahoian | ............. | G06F 1/1616 178/18.03 |
| 8,787,006 B2* | 7/2014 | Golko | ..................... | G06F 1/163 361/679.03 |
| 8,830,211 B2* | 9/2014 | Hill | ...................... | G06F 3/0433 178/18.04 |
| 9,110,536 B2* | 8/2015 | Sorvisto | ................ | G06F 3/0488 |
| 9,159,207 B2 | 10/2015 | Harris | | |
| 9,218,727 B2* | 12/2015 | Rothkopf | ................. | G08B 6/00 |
| 9,245,428 B2* | 1/2016 | Weddle | ................. | G05D 1/005 |
| 9,524,624 B2* | 12/2016 | Rank | ........................ | G08B 6/00 |
| 9,542,820 B2* | 1/2017 | Moussette | ................ | G08B 6/00 |
| 9,558,637 B2* | 1/2017 | Heubel | ..................... | G06F 3/016 |
| 9,612,623 B2* | 4/2017 | Lim | ....................... | G06F 1/166 |

(Continued)

*Primary Examiner* — Lisa Lea-Edmonds
(74) *Attorney, Agent, or Firm* — Fish & Richardson P.C.

(57) ABSTRACT

A system includes a device chassis with a back panel and a haptic conduction interface. An acoustic radiating panel, attached to the chassis, and the back panel define a space. A moving magnet actuator is positioned in the space and mechanically coupled to the acoustic radiating panel, the moving magnet actuator including an element having a thickness smaller than a first dimension of the space, the moving magnet actuator being configured to vibrate the element during operating. An electronic control module coupled to the moving magnet actuator is programmed to activate the moving magnet actuator with a haptic signal that displaces the element in the first direction an amount sufficient to cause the element to contact the haptic conduction interface, the haptic signal having an amplitude and frequency sufficient to generate a haptic response in the device chassis.

17 Claims, 6 Drawing Sheets

(56) References Cited

U.S. PATENT DOCUMENTS

| | | | |
|---|---|---|---|
| 9,804,673 B2* | 10/2017 | Colloms | G06F 3/016 |
| 2012/0038568 A1 | 2/2012 | Colloms | |
| 2012/0056838 A1 | 3/2012 | Harris | |
| 2012/0200520 A1 | 8/2012 | Harris | |
| 2013/0307786 A1* | 11/2013 | Heubel | G06F 3/016 |
| | | | 345/173 |
| 2014/0002386 A1* | 1/2014 | Rosenberg | A63F 13/06 |
| | | | 345/173 |
| 2015/0153828 A1 | 6/2015 | Monkhouse | |
| 2016/0063827 A1* | 3/2016 | Moussette | G08B 6/00 |
| | | | 340/407.2 |
| 2016/0378071 A1* | 12/2016 | Rothkopf | G06F 1/1643 |
| | | | 368/10 |
| 2017/0011210 A1* | 1/2017 | Cheong | H04W 12/06 |

\* cited by examiner

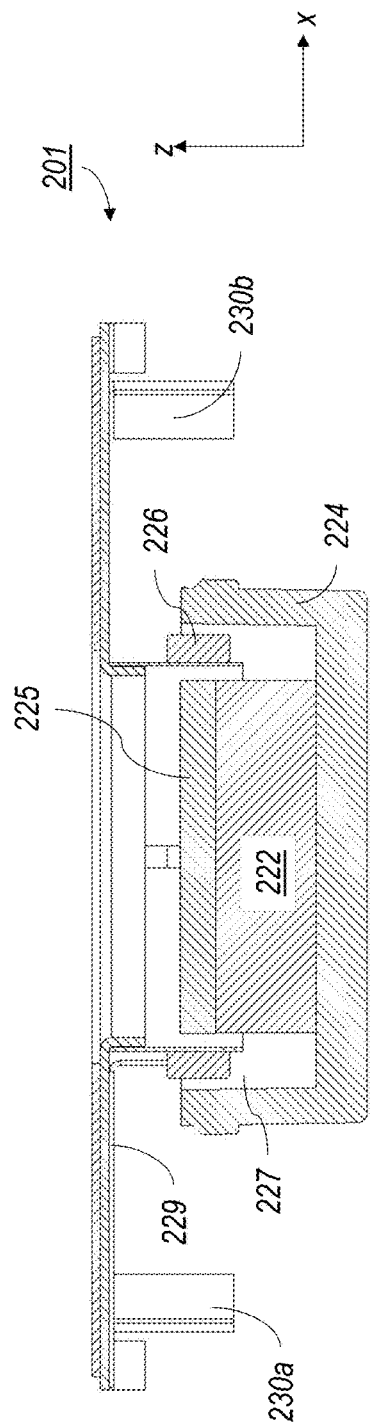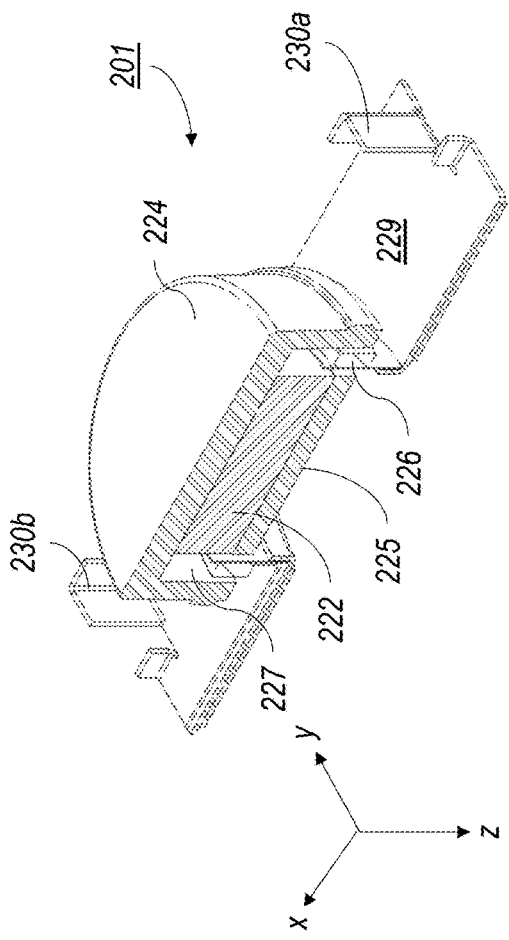
FIG. 3A
FIG. 3B

MOVING MAGNET ACTUATOR FOR HAPTIC ALERTS

CROSS-REFERENCE TO RELATED APPLICATION

This application claims priority to Provisional Application No. 62/633,027, filed on Feb. 20, 2018, and entitled "MOVING MAGNET ACTUATOR FOR HAPTIC ALERTS," the entire contents of which are hereby incorporated by reference.

BACKGROUND

Many mobile devices interact with a user by providing haptic feedback and/or vibration alerting. In general, vibration alerting provides a crude, single, high-frequency vibration or "buzzing" whereas haptic feedback provides a more granular, complex harmonic response that can be varied in both frequency and magnitude of signal.

Although both alerts use vibrations to communicate with the user, haptic feedback devices often use a variety of advanced waveforms to convey information to the user. Vibration alerting products are typically less complicated and are generally designed to produce a strong enough vibration to alert the user of an event.

Currently, audio alerts can provide nuanced acoustic communication by using different tones and musical passages that the user can independently assign to specific types of alerts such as texts, emails, missed calls etc. A vibration alert does not generally allow for such distinction.

SUMMARY

Haptic alerts can provide distinctive tactile communication with the user, for example, through the use of multiple haptic patterns of varying intensity. This may be particularly useful, for example, in instances where a hand-held or wearable device is being used in a public environment where either acoustic alerts or unwanted and/or visual interaction with the display of such a device is not possible or unsafe. One such example is the case of navigating with a smartphone where nuanced haptic feedback could be used to direct the user by haptic stimulation with distinguishable haptic patterns for turn left/right.

The disclosed technologies apply to modal panel systems (distributed mode loudspeakers) designed to provide acoustic and/or haptic feedback. The panel may be a display system, based on OLED or LCD technology for example. The panel may be part of a smartphone or a wearable device.

In general, in a first aspect, the invention features a system that includes a device chassis that includes a back panel, the back panel including a haptic conduction interface. The system also includes an acoustic radiating panel attached to the device chassis, the acoustic radiating panel and back panel defining a space in a first direction between the acoustic radiating panel and back panel having a first dimension. The system further includes a moving magnet actuator positioned in the space and mechanically coupled to the acoustic radiating panel, the moving magnet actuator including an element having a thickness in the first direction smaller than the first dimension of the space, the moving magnet actuator being configured to vibrate the element in the first direction during operating of the device. The system also includes an electronic control module coupled to the moving magnet actuator and programmed to activate the moving magnet actuator with a haptic signal that displaces the element in the first direction an amount sufficient to cause the element to contact the haptic conduction interface, the haptic signal having an amplitude and frequency sufficient to generate a haptic response in the device chassis.

Implementations of the electronic display can include one or more of the following features and/or one or more features of other aspects. For example, the electronic control module can be programmed to activate the moving magnet actuator with one or more acoustic signals, each of the acoustic signals vibrating the element to generate an acoustic response from the acoustic radiating panel. The acoustic signals can also displace the element in the first direction such that the element does not contact the haptic conduction interface.

In some implementations, the electronic control module can be programmed to activate the moving magnet actuator with a plurality of haptic signals each providing a different haptic response in the device chassis. Each of the plurality of signals can also have a different amplitude, frequency, and/or pulse profile.

In other implementations, the acoustic radiating panel can include an electronic display panel.

The electronic display panel can be an organic light emitting diode (OLED) display panel or a liquid crystal display (LCD) panel.

In other implementations, the acoustic radiating panel can include a touch panel. The acoustic radiating panel can also be a planar panel or a curved panel.

In some implementations, the first dimension can be 10 mm or less (e.g., 6 mm or less, 5 mm or less, 4 mm or less, 3 mm or less).

In other implementations, the system can further include an actuator coupling plate physically attached to a surface of the acoustic radiating panel and physically attached to the moving magnetic actuator, the actuator coupling plate providing the mechanical coupling between the acoustic radiating panel and the moving magnetic actuator.

A mobile device can include the system. The mobile device can be a mobile phone or a tablet computer A wearable device can also include the system. The wearable device can be a smart watch or a head-mounted device.

Among other advantages, the systems described in this specification allow an actuator to produce both acoustic output and haptic output using different modes of operation. Another advantage of the described systems is that they allow a user of a device that includes the system to program their own haptic alerts. This can allow the user to assign a specific event, such as an email from a particular member of the user's contacts, a specific haptic output, allowing the user to identify the particular contact's email without having to look at the screen of the device.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3A is a cross-sectional view of the actuator shown in FIG. 2A.

FIG. 3B is a perspective sectional view of the actuator shown in FIG. 2A.

Like reference symbols in the various drawings indicate like elements.

DETAILED DESCRIPTION

Figure 1:
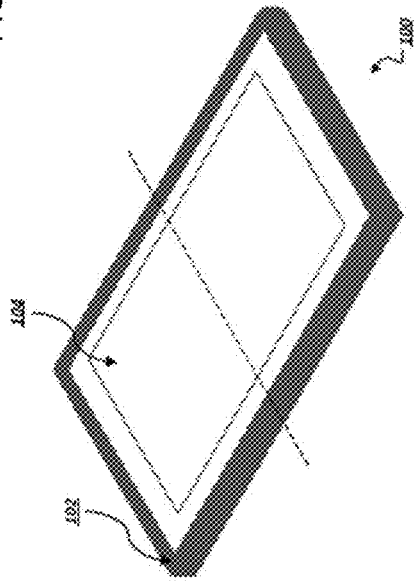
FIG. 1 is a perspective view of an embodiment of a mobile device.

Referring to FIG. 1, a mobile device 100 includes a device chassis 102 and a touch panel display 104 including a flat panel display (e.g., an OLED or LCD display panel). Mobile device 100 interfaces with a user in a variety of ways, including by displaying images and receiving touch input via touch panel display 104. Typically, a mobile device has a depth of approximately 10 mm or less, a width of 60 mm to 80 mm (e.g., 68 mm to 72 mm), and a height of 100 mm to 160 mm (e.g., 138 mm to 144 mm).

Mobile device 100 also produces audio output. The audio output can be generated using a distributed mode loudspeaker, or DML. A DML is a speaker that creates sound by causing a panel to vibrate. A DML typically includes a panel coupled to an actuator, such as a distributed mode actuator, or DMA. The actuator is a movable component arranged to provide a force to a panel, such as touch panel display 104, causing the panel to vibrate. The vibrating panel generates human-audible sound waves, e.g., in the range of 20 Hz to 20 kHz.

In addition to producing sound output, mobile device 100 also produces haptic output using the actuator. The movement of the actuator can also cause the component to contact a haptic conduction interface. The force applied to the haptic conduction interface by the movement of the actuator generates vibrations, e.g., in device chassis 102, that create a haptic output that can be detected by a user who contacts mobile device 100. For example, the haptic output can correspond to vibrations in the range of 180 Hz to 300 Hz.

Figure 2A:
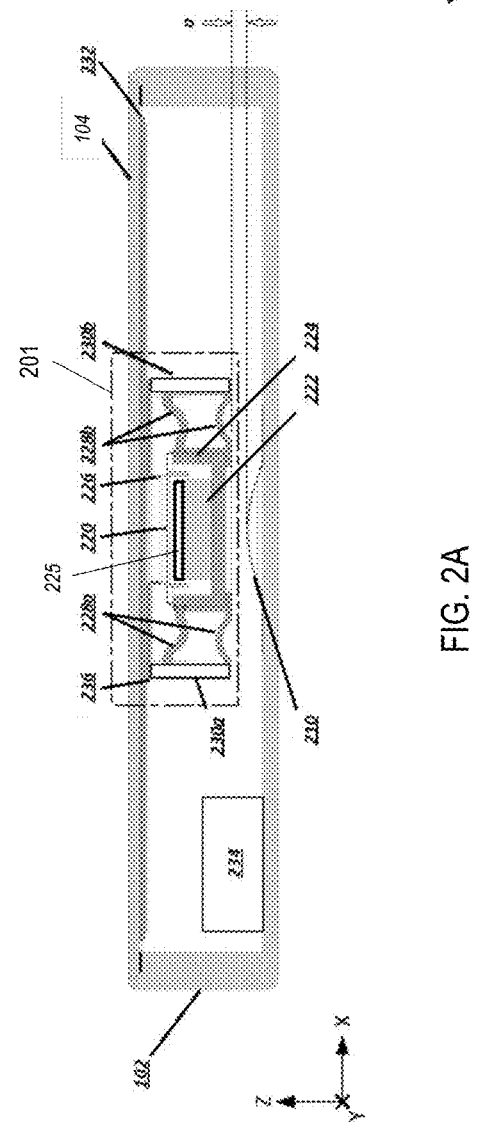
FIG. 2A is a cross-sectional view of the mobile device of FIG. 1, the mobile device including an actuator system in a static state.
Figure 2B:
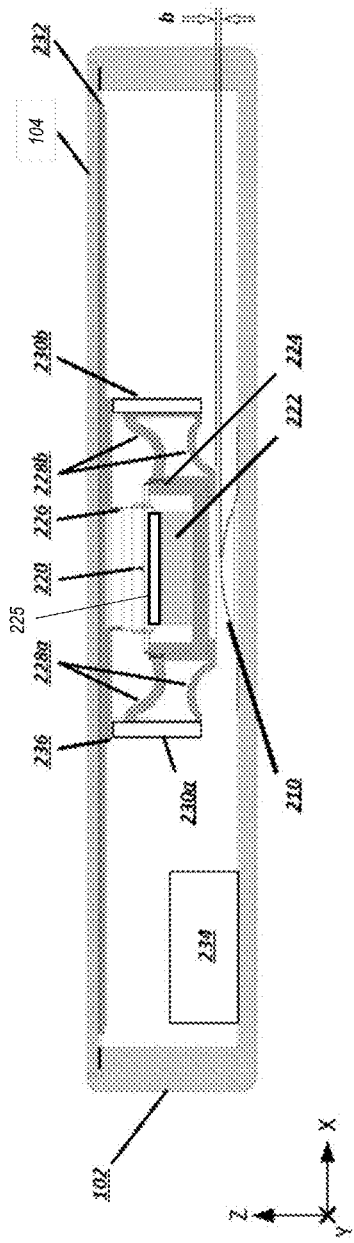
FIG. 2B is a cross-sectional view of the mobile device of FIG. 1, the mobile device including the actuator system of FIG. 2A in a non-haptic state.
Figure 2C:
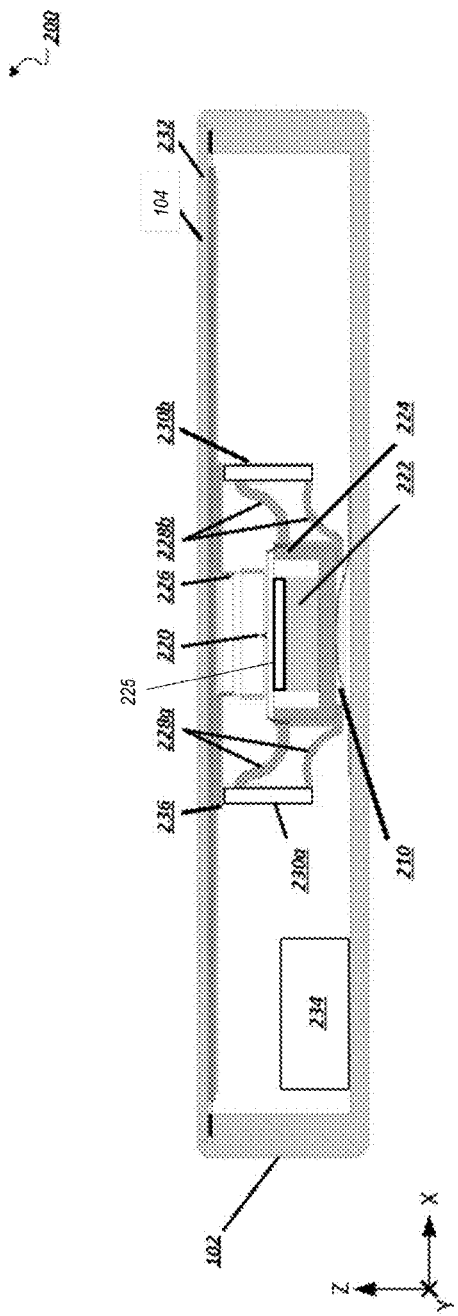
FIG. 2C is a cross-sectional view of the mobile device of FIG. 1, the mobile device including the actuator system of FIG. 2A in a haptic state.

FIG. 1 also shows a dashed line that corresponds to the cross-sectional direction shown in FIGS. 2A through 2C.

Referring to FIG. 2A, a cross-section 200 of mobile device 100 illustrates device chassis 102 and touch panel display 104. FIG. 2A also includes a Cartesian coordinate system with X, Y, and Z axes, for ease of reference. Device chassis 102 has two side portions, with a depth measured along the Z-direction and a width measured along the X-direction. Device chassis 102 also has a back panel, which is formed by the portion of device chassis 102 that extends primarily in the X-direction. A haptic conduction interface 210 is attached (e.g., by a fastener, adhesive, or some other mechanical coupling) to the back panel of device chassis 102.

Figure 3C:
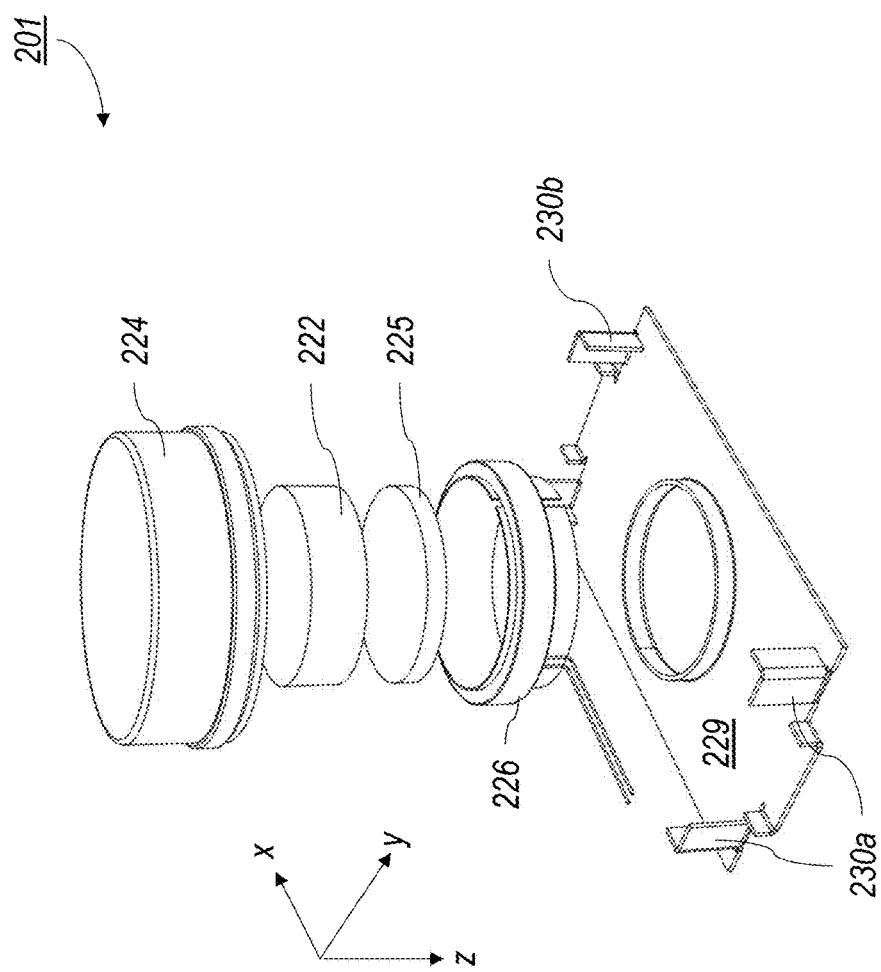
FIG. 3C is an exploded view shown components of the actuator shown in FIG. 2A.

FIG. 2A also illustrates a moving magnet actuator 201 that includes a first module 220 elastically coupled to a second module which is rigidly affixed to front display panel 104. Referring also to FIGS. 3A-3C, which show actuator 201 in cross-section, in a perspective cross-sectional view, and an exploded view, first module 220 includes a magnet 222 (magnetized axially along the z-axis) and a yoke 224. A top plate 225 is attached to magnet 222 on the side of the magnet facing display 104. Yoke 224 and top plate 225 can be formed from ferrous materials, such as iron, mild steel, or carbon steel. In this implementation, a voice coil 226 fits within a magnetic air gap 227 between the axially magnetized magnet 222 and yoke 224. Yoke 224 is mechanically coupled by two elastic components, 228a and 228b, (e.g., springs) (not shown in FIGS. 3A-3C) to a rigid frame 229 that is part of the second module. Frame 229 includes posts 230a and 230b that connect elastic components 228a and 228b, respectively. The elastic components 228a and 228b can flex to allow first module 220 to move in the Z-direction. Posts 230a and 230b are rigidly attached to a coupling plate 236 that, in turn, is coupled to a display layer 232 (e.g., OLED) which is mechanically affixed to display screen 104 (e.g., glass). In some embodiments, the acoustic radiating assembly includes both display layer 232 and display screen 104.

In general, voice coil 226 can be fastened to coupling plate 236 in any number of ways including by adhesive or directly by means of winding the voice coil wire directly on to a perpendicularly formed section of the coupling plate 236. The moving magnet actuator 201 is also electrically coupled to an electronic control module 234, housed inside device chassis 102, e.g., attached to a printed circuit board housed within device chassis 102.

Electronic control module 234 is configured to energize voice coil 226 by providing electrical current to the coil. The current induces an axial magnetic field along voice coil 226's axis, i.e., parallel to the Z axis. Magnet 222, being positioned in the induced magnetic field and having a permanent axial magnetic field, experiences a force due to its interaction with the induced magnetic field from the voice coil, and is displaced in the Z-direction. The displacement direction depends on the respective polarities of the interacting magnetic fields. Device chassis 102 should also have a first dimension measured in the Z-direction that is long enough to accommodate the displacement of the moving magnetic actuator. For example, device chassis 102 can have a first dimension measured in the Z-direction that can be 10 mm or less (e.g., 6 mm or less, 5 mm or less, 4 mm or less, 3 mm or less).

FIG. 2A illustrates cross-section 200 of mobile device 100 when the moving magnet actuator is in the static state. In other words, there is no current energizing voice coil 226 and the relative position between the first and second modules is determined by the unflexed state of components 228a and 228b. While in the static state, the bottom edge of yoke 224 is separated from the top edge of haptic conduction interface 210 by a distance a.

While FIG. 2A illustrates cross-section 200 of mobile phone 100 when the actuator is in the static state, FIG. 2B shows an actuator non-haptic state in which a magnetic field has been induced and first module 220 has moved in the negative Z-direction. To illustrate this movement, FIG. 2B also includes a distance b, measured from the bottom edge of yoke 224 to the top edge of haptic conduction interface 210, that is smaller than the distance a. While the moving magnet actuator is in the non-haptic state, the moving magnet actuator can move linearly in the Z-direction so that the distance between the moving magnet actuator and haptic conduction interface 210 can change from the distance a to the distance b.

Displacement amplitudes of first module from the static state can vary, but are typically in a range from about 0.01 mm to about 1 mm.

Because the moving magnet actuator is coupled to coupling plate 236 which is coupled to acoustic radiating panel 232 by posts 230a and 230b, the force generated by the movement of the moving magnet actuator is transferred to coupling plate 236 and then to acoustic radiating panel 232. The force causes acoustic radiating panel 232 to vibrate, generating sound waves.

When the moving magnet actuator generates sound waves while in the non-haptic state, the electronic control module 234 can ensure that the voltage applied across voice coil 226 does not increase past a value that would cause the distance between the moving magnet actuator and haptic conduction interface 210 to be smaller than the distance b. In other words, when the moving magnet actuator is in the non-haptic state, electronic control module 234 does not allow yoke 224 to contact haptic conduction interface 210.

Referring to FIG. 2C, mobile phone 100 is shown in a haptic state in which first module 220 contacts haptic conduction interface 210, transferring vibrations to chassis 102 via haptic conduction interface 210. The transferred vibrations manifest as a haptic output.

In general, the components of mobile phone 100 can be constructed of any material, or combination of materials, that have suitable mechanical properties and can be formed into the appropriate shapes. Generally, materials used should be sufficiently rigid to bear stresses associated with the use of the moving magnet actuator in the operational states discussed herein.

For example, yoke 224 should be composed of a material that is sufficiently rigid to support magnet 222 and conduct vibrations to haptic conduction interface 210 without being substantially deformed.

To allow yoke 224 to move linearly in the Z-direction, elastic components 228a and 228b should be formed from an elastically-deformable material or materials. In some embodiments, leaf spring elements, formed from a metal or alloy are used.

Posts 230a and 230b should be sufficiently rigid to support elastic components 228a, b, and first module 220. Posts 230a and 230b can be attached to elastic components 228a and 228b, respectively and coupling plate 236 in any number of ways so long and they can remain adhered to these components despite the stresses caused by the movement of the moving magnet actuator. For example, these components can be fastened to one another by adhesive or fasteners.

Coupling plate 236 should be composed of a nonferrous material so that it does not produce a magnetic field that interferes with the one induced by the current that passes through voice coil 226. Coupling plate 236 can also be used to dissipate heat generated by elastic components 228a and 228b. Coupling plate 236 can be fastened to acoustic radiating panel 232 in any number of ways such as an adhesive.

Acoustic radiating panel 232 should also be composed of a nonferrous material so that it does not produce a magnetic field that interferes with the induced magnetic field of voice coil 226. Acoustic radiating panel 232 should also be composed of a material that is sufficiently rigid to vibrate to allow the generation of sound waves. Rigid metal or plastic sheets can be used. Acoustic radiating panel 232 can be fastened to touch panel display 104 in any number of ways, such as an adhesive. While acoustic radiating panel 232 is depicted as being planar, more generally, the acoustic radiating panel can be planar or curved, so long as it is able to vibrate to generate sound waves. In this implementation, mobile phone 100 includes both touch panel display 104 and acoustic radiating panel 232. However, in other implementations, mobile device 100 can include a touch panel display and no acoustic radiating panel 232. In these implementations, the touch panel display can vibrate, generating sound waves.

Haptic conduction interface 220 should be sufficiently rigid to bear the impact of yoke 224 without being substantially deformed. In addition, haptic conduction interface 210 should be constructed of a material that allows the propagation of a wave generated by the impact of yoke 224 on the surface of haptic conduction interface 210.

Magnet 222 can be constructed of any material or combination of materials such that it can produce a permanent magnetic field. For example, magnet 222 can be a ferromagnet. Magnet 222 can also be an electromagnet. In this implementation, magnet 222 is able to pass through one end of voice coil 226.

Voice coil 226 should be an electrically-conductive material. For example, voice coil 226 can be constructed of copper wire that has been wound into a coil. Voice coil 226 can be fastened to coupling plate 236 in any number of ways including by adhesive or fasteners such as clamps or bolts.

Figure 4:
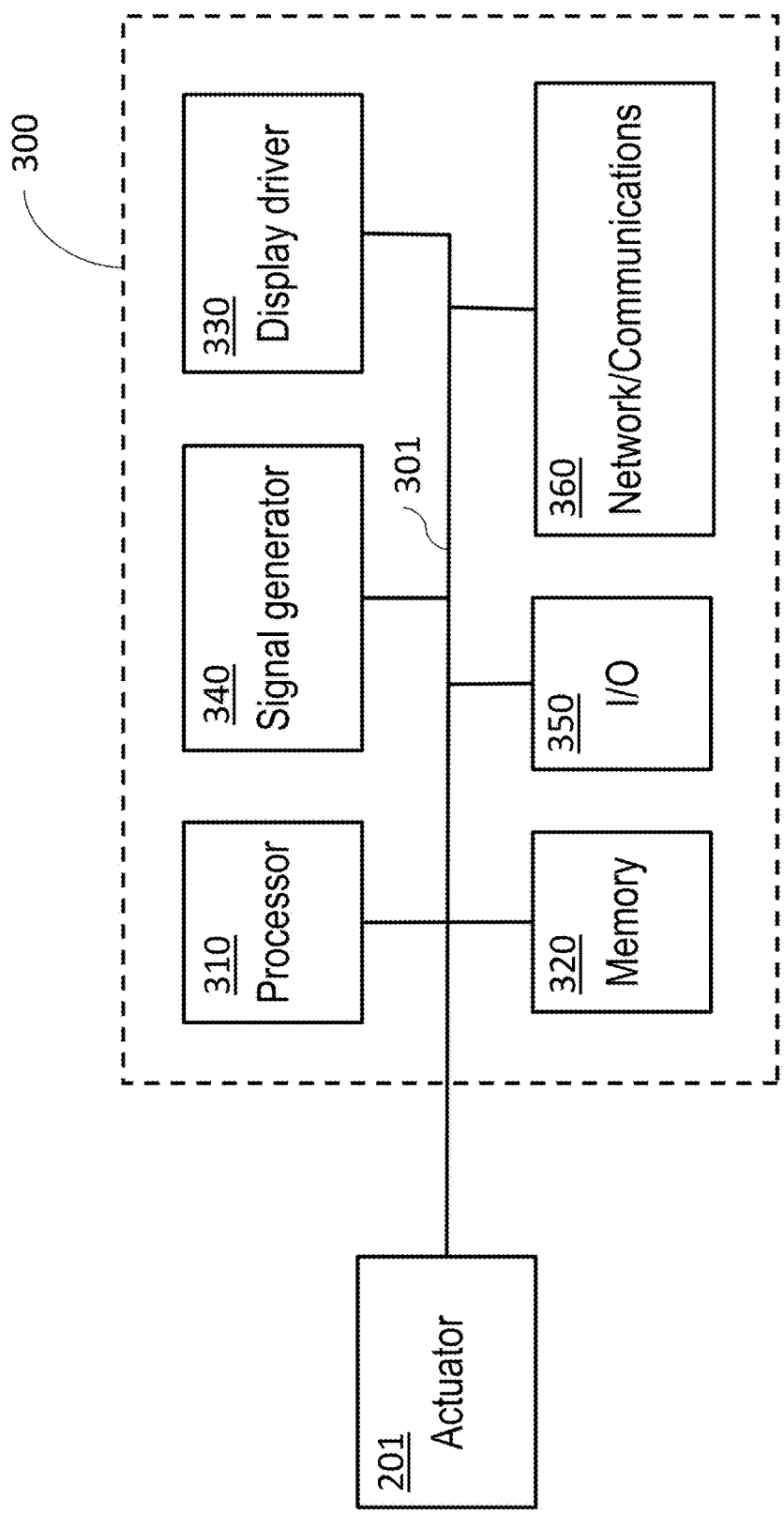
FIG. 4 is a schematic diagram of an embodiment of an electronic control module for a mobile device.

Electronic control module 234 is generally composed of one or more electronic components that receive input from one or more sensors and/or signal receivers of the mobile phone, process the input, and generate and deliver signal waveforms that cause actuator 201 to provide a suitable haptic response. Referring to FIG. 4, an exemplary electronic control module 300 of a mobile device, such as mobile phone 100, includes a processor 310, memory 320, a display driver 330, a signal generator 340, an input/output (I/O) module 350, and a network/communications module 360. These components are in electrical communication with one another (e.g., via a signal bus) and with actuator 201.

Processor 310 may be implemented as any electronic device capable of processing, receiving, or transmitting data or instructions. For example, processor 310 can be a microprocessor, a central processing unit (CPU), an application-specific integrated circuit (ASIC), a digital signal processor (DSP), or combinations of such devices.

Memory 320 has various instructions, computer programs or other data stored thereon. The instructions or computer programs may be configured to perform one or more of the operations or functions described with respect to the mobile device. For example, the instructions may be configured to control or coordinate the operation of the device's display via display driver 330, waveform generator 340, one or more components of I/O module 350, one or more communication channels accessible via network/communications module 360, one or more sensors (e.g., biometric sensors, temperature sensors, accelerometers, optical sensors, barometric sensors, moisture sensors and so on), and/or actuator 201.

Signal generator 340 is configured to produce AC waveforms of varying amplitudes, frequency, and/or pulse profiles suitable for energizing voice coil 226 of actuator 201 and producing acoustic and haptic responses via the moving magnet actuator. Although depicted as a separate component, in some embodiments, signal generator 340 can be part of processor 310.

Memory 320 can store electronic data that can be used by the mobile device. For example, memory 320 can store electrical data or content such as, for example, audio and video files, documents and applications, device settings and user preferences, timing and control signals or data for the various modules, data structures or databases, and so on. Memory 320 may also store instructions for recreating the various types of waveforms that may be used by signal generator 340 to generate signals for actuator 201. Memory 320 may be any type of memory such as, for example, random access memory, read-only memory, Flash memory, removable memory, or other types of storage elements, or combinations of such devices.

As briefly discussed above, electronic control module 300 may include various input and output components represented in FIG. 4 as I/O module 350. Although the components of I/O module 350 are represented as a single item in FIG. 4, the mobile device may include a number of different input components, including buttons, microphones, switches, and dials for accepting user input. In some embodiments, the components of I/O module 350 may include one or more touch sensor and/or force sensors. For example, the mobile device's display may include one or more touch sensors and/or one or more force sensors that enable a user to provide input to the mobile device.

Each of the components of I/O module 350 may include specialized circuitry for generating signals or data. In some cases, the components may produce or provide feedback for application-specific input that corresponds to a prompt or user interface object presented on the display.

As noted above, network/communications module 360 includes one or more communication channels. These communication channels can include one or more wireless interfaces that provide communications between processor 310 and an external device or other electronic device. In general, the communication channels may be configured to transmit and receive data and/or signals that may be interpreted by instructions executed on processor 310. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

In some implementations, one or more of the communication channels of network/communications module 360 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the electronic device 1300 to a mobile phone for output on that device and vice versa. Similarly, the network/communications module 360 may be configured to receive input provided on another device to control the mobile device. For example, an audible alert, visual notification, or haptic alert (or instructions therefor) may be transmitted from the external device to the mobile device for presentation.

Figure 5A:
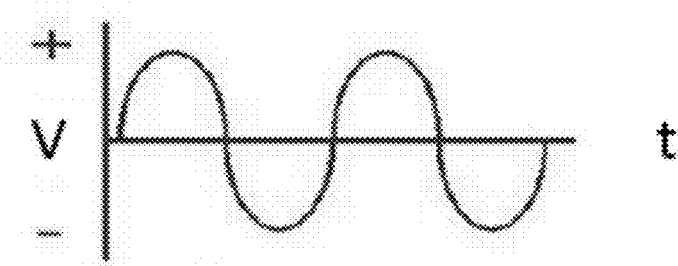
FIG. 5A is a plot of an AC signal showing voltage as a function of time.
Figure 5B:
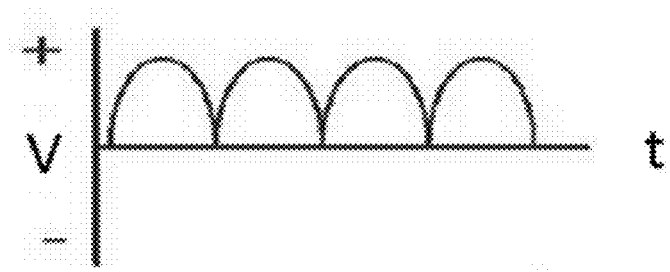
FIG. 5B is a plot of the output signal of a full-wave rectifier circuit where the input is the AC signal shown in FIG. 5A.
Figure 5C:
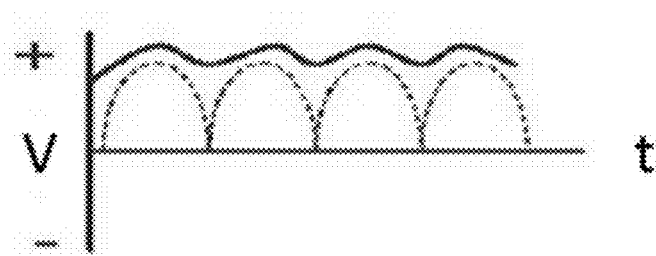
FIG. 5C is a plot of the signal shown in FIG. 5B after being smoothed.

FIGS. 5A-5D illustrate AC signals that can be output by the signal generator of electronic control module 234. The X-axis of FIGS. 5A-5D represents time, while the Y-axis represents the voltage output by electronic control module 234. FIGS. 5A-5C show how to generate a smoothed, rectified AC driving signal. To produce a haptic output, electronic control module 234 generates the AC driving signal, which has a DC offset that is sufficient to displace first module 220 so that it makes contact with haptic conduction interface 120. The AC component of the driving signal causes first module 220 to move up and down in the Z-direction, generating vibrations that are conducted through haptic conduction interface 210.

FIG. 5A illustrates an AC signal with sufficient amplitude to cause first module 210 to contact haptic conduction interface 210 and with a frequency that is able to cause first module 220 to generate the desired haptic response. In this implementation, when the moving magnet actuator is in the static state, electronic control module 234 applies a positive voltage to move the moving magnet actuator in the negative Z-direction. Also in this implementation, the moving magnet actuator is not moved in the positive Z-direction from its static state, (in other implementations, a negative voltage can induce a current that causes the moving magnet actuator to move in the negative Z-direction). The waveform generator of electronic control module 234 can include a rectifier circuit to remove the negative portions of the AC signal, so that the moving magnet actuator does not move in the positive Z-direction. FIG. 5B illustrates the output of a full-wave rectifier circuit.

The rectified output of electronic control module 234 can also be smoothed, e.g., by a smoothing capacitor. One example of why electronic control module 234 smooths the rectified output is so the moving magnet actuator does not move to its position in the static state illustrated in FIG. 5A following every impact with haptic conduction interface 210. This reduces the distance that the moving magnet actuator moves when generating acoustic and haptic output. Reducing this distance can reduce the stress on elastic components 228a and 228b caused by repeated extension and compression. While operating in the haptic state, the moving magnet actuator typically moves approximately 2 mm or less in the Z-direction. FIG. 5C illustrates the smoothed output of the rectifier circuit that can be used as a driving signal to control the moving magnet actuator.

While FIGS. 5A-5C illustrate generation of a simple, smoothed, rectified waveform for generating a haptic response, more complex waveform generation is generally possible. Electronic control module 234 can vary a number of parameters related to the driving signal, such as the amplitude of the driving signal, i.e., the signal's peak voltage. Doing so can vary the intensity of the haptic output. Increasing the peak positive voltage of the waveform generated by electronic control module 234 past the threshold value increases the force applied on magnet 222 by the induced magnetic field. Accordingly, the increased force applied on magnet 222 can cause first module 220 to impact the haptic conduction interface 210 with a greater force than would be generated by driving the moving magnet actuator with a waveform that has a peak voltage of the threshold voltage.

Not only can electronic control module 234 vary the peak voltage of the driving signal, it can also vary its frequency. Increasing the frequency of the driving signal results in an increased frequency of haptic output.

Electronic control module 234 can also control the pulse profile of the driving signal. For example, electronic control module 234 can determine when it is outputting the driving signal. This allows the module to control the timing of the haptic output. For example, the moving magnet actuator can output a series of haptic responses, followed by a pause, followed by another series of haptic responses.

Figure 5D:
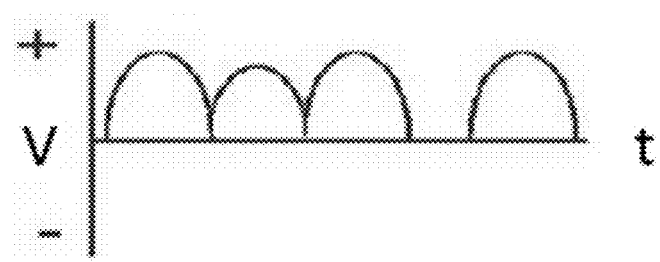
FIG. 5D is a plot of a full-wave rectified signal with varying amplitudes and pulse profiles.

Electronic control module 234 can vary multiple parameters of the driving signal concurrently. For example, electronic control module 234 can output three peaks at a certain frequency and amplitude, followed by a pause, followed by a single peak at a different amplitude. FIG. 5D, illustrates an example of varying the amplitude and pulse profile of a signal before smoothing.

Electronic control module 234 can include a database of pre-programmed driving signals. In response to an event, a user of mobile device 100 can configure the device to generate a haptic output corresponding to one of the pre-programmed driving signals. For example, the event can be receiving an email, and the haptic response can be specific to the sender of the email. As another example, the mobile device can include a navigation application that is configured to generate a first haptic output to alert the user to turn right, and a second haptic output to alert the user to turn left.

A user of mobile device 100 can also create custom haptic outputs. For example, mobile device 100 can include a user interface that allows users to generate their own driving signals. The user-generated driving signals can then be added to the database of driving signals and assigned as haptic output to be generated in response to a user-specified event.

In this implementation, the moving magnet actuator includes magnet 222 attached to yoke 224. However, in other implementations, the moving magnet actuator can include a single component that acts as both a magnet to interact with the induced electric field of voice coil 226 and a yoke to contact haptic conduction interface 210. In other embodiments, magnet 222 can be the component of the moving magnet actuator that contacts haptic conduction interface 210.

In this implementation, voice coil 226 surrounds magnet 222; however, in other implementations the magnet can have a cavity and voice coil 226 can enter the cavity in the magnet.

In FIGS. 2A-2C, haptic conduction interface 210 is shown as being bell-shaped; however, in other implementations other geometries can be used. For example, the top edge of haptic conduction interface 210 can be flat.

The haptic conduction interface 210 can also be shaped such that it conforms with the bottom surface of yoke 224. For example, in other embodiments yoke 224 can have a bell shape similar to the shape of haptic conduction interface 210, but flipped across the X-axis. In those implementations, when the yoke is a flipped bell shape, the portion of haptic conduction interface that contacts the yoke can be flat.

Moreover, while the examples above feature a mobile phone, the disclosed technology can be implemented in other devices too. For example, the disclosed technology can be implemented in other mobile devices, such as tablet computers. The disclosed technology can also be implemented in wearable devices, such as smartwatches, head mounted devices (e.g., AR/VR headsets, smart glasses like Google Glass), and the like.

Accordingly, other embodiments are in the following claims.

What is claimed is:

1. A system, comprising:
   a device chassis comprising a back panel, the back panel comprising a haptic conduction interface;
   an acoustic radiating panel attached to the device chassis, the acoustic radiating panel and back panel defining a space in a first direction between the acoustic radiating panel and back panel having a first dimension;
   a moving magnet actuator positioned in the space and mechanically coupled to the acoustic radiating panel, the moving magnet actuator comprising an element having a thickness in the first direction smaller than the first dimension of the space, the moving magnet actuator being configured to vibrate the element in the first direction during operating of the device; and
   an electronic control module coupled to the moving magnet actuator and programmed to activate the moving magnet actuator with a haptic signal that displaces the element in the first direction an amount sufficient to cause the element to contact the haptic conduction interface, the haptic signal having an amplitude and frequency sufficient to generate a haptic response in the device chassis.

2. The system of claim 1, wherein the electronic control module is programmed to activate the moving magnet actuator with one or more acoustic signals, each of the acoustic signals vibrating the element to generate an acoustic response from the acoustic radiating panel.

3. The system of claim 2, wherein the acoustic signals displace the element in the first direction such that the element does not contact the haptic conduction interface.

4. The system of claim 1, wherein the electronic control module is programmed to activate the moving magnet actuator with a plurality of haptic signals each providing a different haptic response in the device chassis.

5. The system of claim 4, wherein each of the plurality of signals has a different amplitude, frequency, and/or pulse profile.

6. The system of claim 1, wherein the acoustic radiating panel comprises an electronic display panel.

7. The system of claim 1, wherein the electronic display panel is an organic light emitting diode (OLED) display panel.

8. The system of claim 1, wherein the electronic display panel is a liquid crystal display (LCD) panel.

9. The system of claim 1, wherein the acoustic radiating panel comprises a touch panel.

10. The system of claim 1, wherein the acoustic radiating panel is a planar panel.

11. The system of claim 1, wherein the acoustic radiating panel is a curved panel.

12. The system of claim 1, wherein the first dimension is 10 mm or less.

13. The device of claim 1, further comprising an actuator coupling plate physically attached to a surface of the acoustic radiating panel and physically attached to the moving magnetic actuator, the actuator coupling plate providing the mechanical coupling between the acoustic radiating panel and the moving magnetic actuator.

14. A mobile device comprising:
   a device chassis comprising a back panel, a haptic conduction interface being coupled to the back panel;
   a display panel attached to the device chassis, the display panel and back panel defining a space in a first direction between the display panel and back panel having a first dimension;
   a moving magnet actuator positioned in the space and mechanically coupled to the display panel, the moving magnet actuator comprising an element having a thickness in the first direction smaller than the first dimension of the space, the moving magnet actuator being configured to vibrate the element in the first direction during operating of the device; and an electronic control module comprising a processor and a storage device, the electronic control module being coupled to the moving magnet actuator and programmed to activate the moving magnet actuator with a haptic signal that displaces the element in the first direction an amount sufficient to cause the element to contact the haptic conduction interface, the haptic signal having an amplitude and frequency sufficient to generate a haptic response in the device chassis.

15. The mobile device of claim 14, wherein the mobile device is a mobile phone or a tablet computer.

16. A wearable device comprising:

a device chassis comprising a back panel, the back panel comprising a haptic conduction interface;

an acoustic radiating panel attached to the device chassis, the acoustic radiating panel and back panel defining a space in a first direction between the acoustic radiating panel and back panel having a first dimension;

a moving magnet actuator positioned in the space and mechanically coupled to the acoustic radiating panel, the moving magnet actuator comprising an element having a thickness in the first direction smaller than the first dimension of the space, the moving magnet actuator being configured to vibrate the element in the first direction during operating of the device; and an electronic control module comprising a processor and a storage device, the electronic control module being coupled to the moving magnet actuator and programmed to activate the moving magnet actuator with a haptic signal that displaces the element in the first direction an amount sufficient to cause the element to contact the haptic conduction interface, the haptic signal having an amplitude and frequency sufficient to generate a haptic response in the device chassis.

17. The wearable device of claim 16, wherein the wearable device is a smart watch or a head-mounted device.

* * * * *